US010841329B2

(12) United States Patent
Valecha et al.

(10) Patent No.: US 10,841,329 B2
(45) Date of Patent: Nov. 17, 2020

(54) COGNITIVE SECURITY FOR WORKFLOWS

(71) Applicant: International Business Machines Corporation, Armonk, NY (US)

(72) Inventors: Vinod A. Valecha, Pune (IN); Krzysztof A. Rudek, Nowy Wisnicz (PL); Markus Blohberger, Warngau (DE)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 15/684,383

(22) Filed: Aug. 23, 2017

(65) Prior Publication Data
US 2019/0068630 A1 Feb. 28, 2019

(51) Int. Cl.
H04L 29/06 (2006.01)
G06N 5/04 (2006.01)
G06N 20/00 (2019.01)

(52) U.S. Cl.
CPC ......... H04L 63/1433 (2013.01); G06N 5/043 (2013.01); G06N 20/00 (2019.01);
(Continued)

(58) Field of Classification Search
CPC ............. H04L 63/1433; H04L 63/1416; H04L 63/1425; H04L 63/20; H04L 63/1408; G06N 20/00; G06N 5/043
See application file for complete search history.

(56) References Cited

U.S. PATENT DOCUMENTS 7,577,554 B2 * 8/2009 Lystad ............. G06Q 10/06312
703/2
7,805,325 B2 * 9/2010 Rits .................. G06Q 10/06316
705/7.26
(Continued)

FOREIGN PATENT DOCUMENTS

CN 104731574 A 6/2015

OTHER PUBLICATIONS

F. A. Braz, E. B. Fernandez and M. VanHilst, "Eliciting Security Requirements through Misuse Activities," 2008 19th International Workshop on Database and Expert Systems Applications, Turin, 2008, pp. 328-333. (Year: 2008).*
(Continued)

Primary Examiner — Jung W Kim
Assistant Examiner — Sameera Wickramasuriya
(74) Attorney, Agent, or Firm — Stephen R. Tkacs; Stephen J. Walder, Jr.; Jeffrey S. LaBaw

(57) ABSTRACT

A mechanism is provided in a data processing system comprising at least one processor and at least one memory, the at least one memory comprising instructions which are executed by the at least one processor and configure the processor to implement a cognitive security system. The cognitive security system generates a violation array. Each entry of the violation array represents identification of a workflow activity that violates a security policy. Responsive to a new workflow orchestration being created by a user, the cognitive security system compares each activity of the new workflow orchestration to the violation array. Responsive to determining a given activity of the new workflow orchestration exists in the violation array, the cognitive security system recommends to the user to remove the given activity from the new workflow orchestration.

20 Claims, 5 Drawing Sheets

(52) U.S. Cl.
CPC ...... *H04L 63/1408* (2013.01); *H04L 63/1416* (2013.01); *H04L 63/1425* (2013.01); *H04L 63/20* (2013.01)

(56) References Cited

U.S. PATENT DOCUMENTS

| | | | | |
|---|---|---|---|---|
| 7,996,374 | B1* | 8/2011 | Jones | G06Q 10/10 |
| | | | | 707/694 |
| 8,005,779 | B2* | 8/2011 | Baeuerle | G06F 9/451 |
| | | | | 706/47 |
| 9,210,040 | B2* | 12/2015 | Mikkilineni | H04L 41/0886 |
| 9,444,786 | B2* | 9/2016 | Childress | G06Q 10/0633 |
| 9,516,053 | B1* | 12/2016 | Muddu | G06F 16/254 |
| 10,389,738 | B2* | 8/2019 | Muddu | G06N 20/00 |
| 2003/0212580 | A1* | 11/2003 | Shen | G06Q 50/22 |
| | | | | 705/2 |
| 2006/0004749 | A1* | 1/2006 | Dettinger | G06Q 10/06 |
| 2008/0168529 | A1* | 7/2008 | Anderson | G06F 21/577 |
| | | | | 726/1 |
| 2010/0324952 | A1* | 12/2010 | Bastos | G06Q 10/00 |
| | | | | 705/7.28 |
| 2011/0131658 | A1* | 6/2011 | Bahl | G06F 21/577 |
| | | | | 726/25 |
| 2012/0117656 | A1* | 5/2012 | Arsac | G06Q 10/06 |
| | | | | 726/26 |
| 2014/0074905 | A1* | 3/2014 | Schincariol | G06F 9/5072 |
| | | | | 709/201 |
| 2015/0178129 | A1 | 6/2015 | Dube et al. | |
| 2016/0334837 | A1 | 11/2016 | Shepard et al. | |
| 2017/0278066 | A1* | 9/2017 | Chakravarty | G06Q 10/06 |
| 2018/0027006 | A1* | 1/2018 | Zimmermann | G06F 9/50 |
| 2018/0165768 | A1* | 6/2018 | Unsworth | H04L 63/1425 |
| 2018/0337941 | A1* | 11/2018 | Kraning | H04L 63/1433 |
| 2018/0365608 | A1* | 12/2018 | Powell | G06F 9/50 |
| 2019/0098037 | A1* | 3/2019 | Shenoy, Jr. | H04L 63/1425 |
| 2019/0228419 | A1* | 7/2019 | Sampath | G06K 9/6215 |

OTHER PUBLICATIONS

T. Chen, Y. Huang, T. Chou, C. Shih and J. W. S. Liu, "Model-Based Development of User-Centric Automation and Assistive Devices/Systems," in IEEE Systems Journal, vol. 6, No. 3, pp. 388-400, Sep. 2012. (Year: 2012).*

Anupa, J. et al., "Cloud workflow and security: A survey", 2014 International Conference on Advances in Computing, Communications and Informatics (ICACCI), Sep. 24-27, 2014, 3 pages (Abstract Only).

Atluri, Vijayalakshmi et al., "Security for Workflow Systems", Handbook of Database Security: Applications and Trends, Mar. 2007, 10 pages.

Dube, Parijat et al., "Identification and approximations for systems with multi-stage workflows", Proceedings of the 2011 Winter Simulation Conference (WSC), Dec. 11-14, 2011, 3 pages (Abstract Only).

* cited by examiner

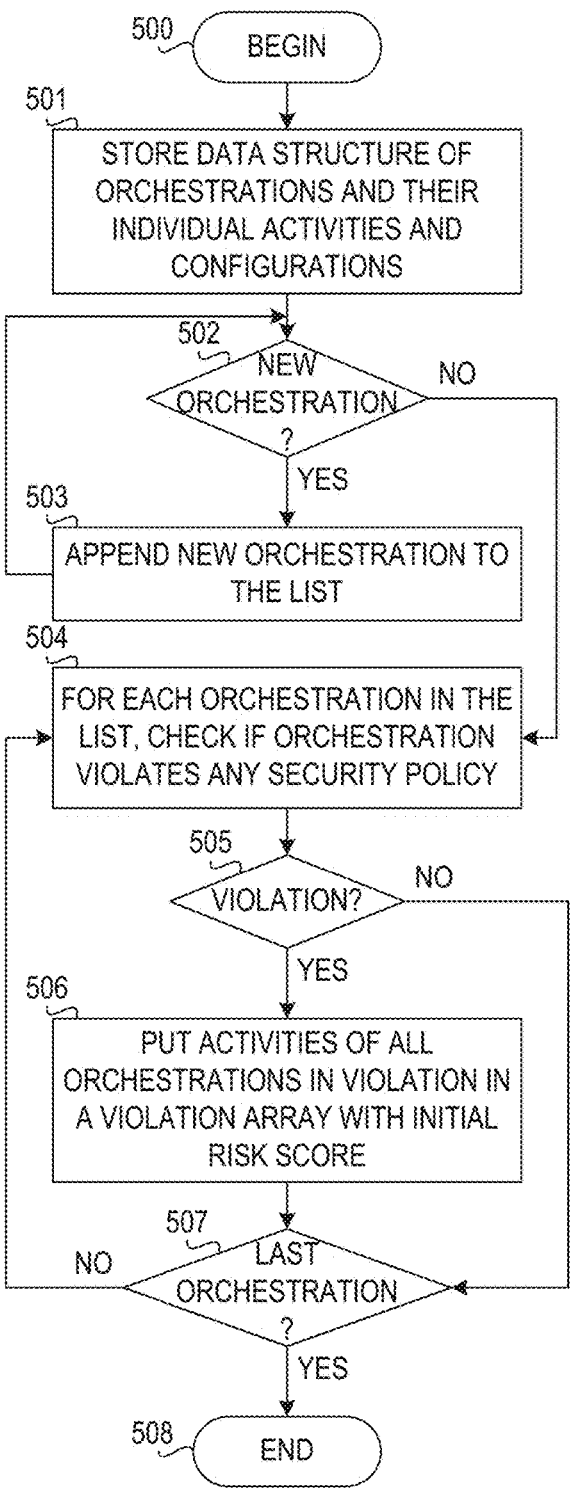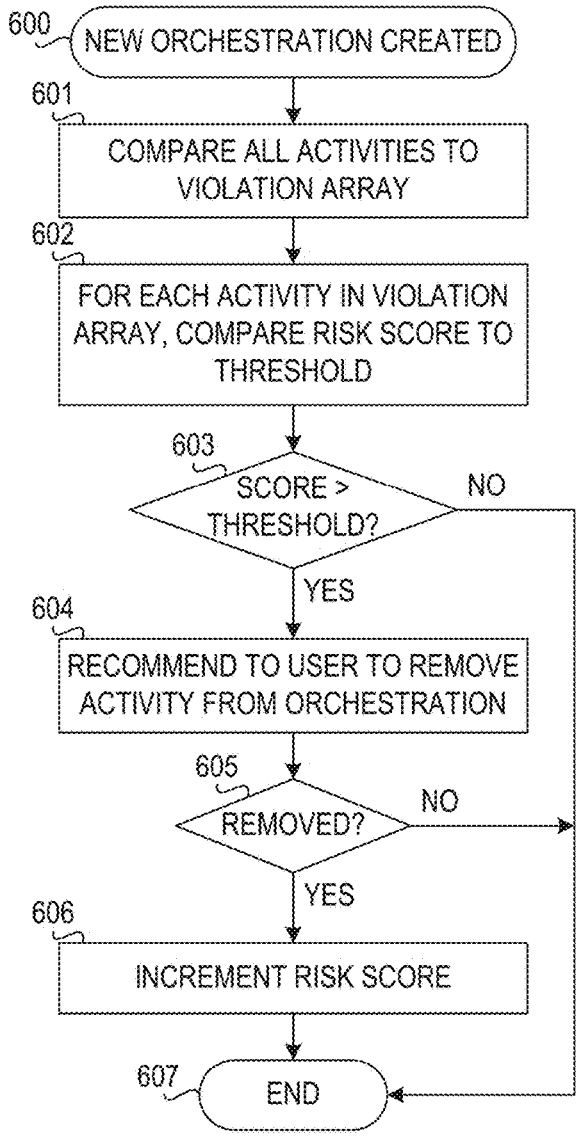

US 10,841,329 B2

COGNITIVE SECURITY FOR WORKFLOWS

BACKGROUND

The present application relates generally to an improved data processing apparatus and method and more specifically to mechanisms for cognitive security for workflows.

A workflow consists of an orchestrated and repeatable pattern of activity enabled by the systematic organization of resources into processes that, transform materials, provide services, or process information. A workflow can be depicted as a sequence of activities, declared as work of one or more simple or complex computer mechanisms, possibly with interaction from users. From a more abstract or higher-level perspective, a workflow may be considered a view or representation of real work performed by a data processing system. The flow being described may refer to a document, service, or product that is being transferred from one step to another. Workflows may be viewed as one fundamental building block to be combined with other parts of data processing system structure.

Cloud computing introduces more-granular and specific meanings of the terms "workflows" and "processes" as used in different domains. Processes can be identified at both the level of inter-company business and the level of wide area network ("the cloud") operations. An "orchestrator" is understood to be the entity which manages complex cross-domain (system, enterprise, firewall) processes and handles exceptions. Since an orchestrator is valuable in fulfillment, assurance, and billing processes, service-aware incarnations of an orchestrator should be capable of adjustments based on feedback from monitoring tools.

Cloud service orchestration consists of these elements: composing of architecture, tools, and processes used by humans to deliver a defined service; stitching of software and hardware components together to deliver a defined service; connecting and automating of workflows when applicable to deliver a defined service. Orchestration is critical in the delivery of cloud services for these reasons: cloud services are intended to scale arbitrarily and dynamically without requiring direct human intervention to do so; cloud service delivery includes fulfillment assurance and billing; cloud services delivery entails workflows in various technical domains.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions which are executed by the at least one processor and configure the processor to implement a cognitive security system. The method comprises generating, by the cognitive security system, a violation array, wherein each entry of the violation array represents identification of a workflow activity that violates a security policy. The method further comprises responsive to a new workflow orchestration being created by a user, comparing, by the cognitive security system, each activity of the new workflow orchestration to the violation array. The method further comprises responsive to determining a given activity of the new workflow orchestration exists in the violation array, recommending, by the cognitive security system, to the user to remove the given activity from the new workflow orchestration.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is a flowchart illustrating operation of a cognitive security training mechanism in accordance with an illustrative embodiment; and FIG. 6 is a flowchart illustrating operation of a cognitive security, mechanism for recommending activity removal or replacement in a newly created orchestration in accordance with an illustrative embodiment.

DETAILED DESCRIPTION

Figure 1:
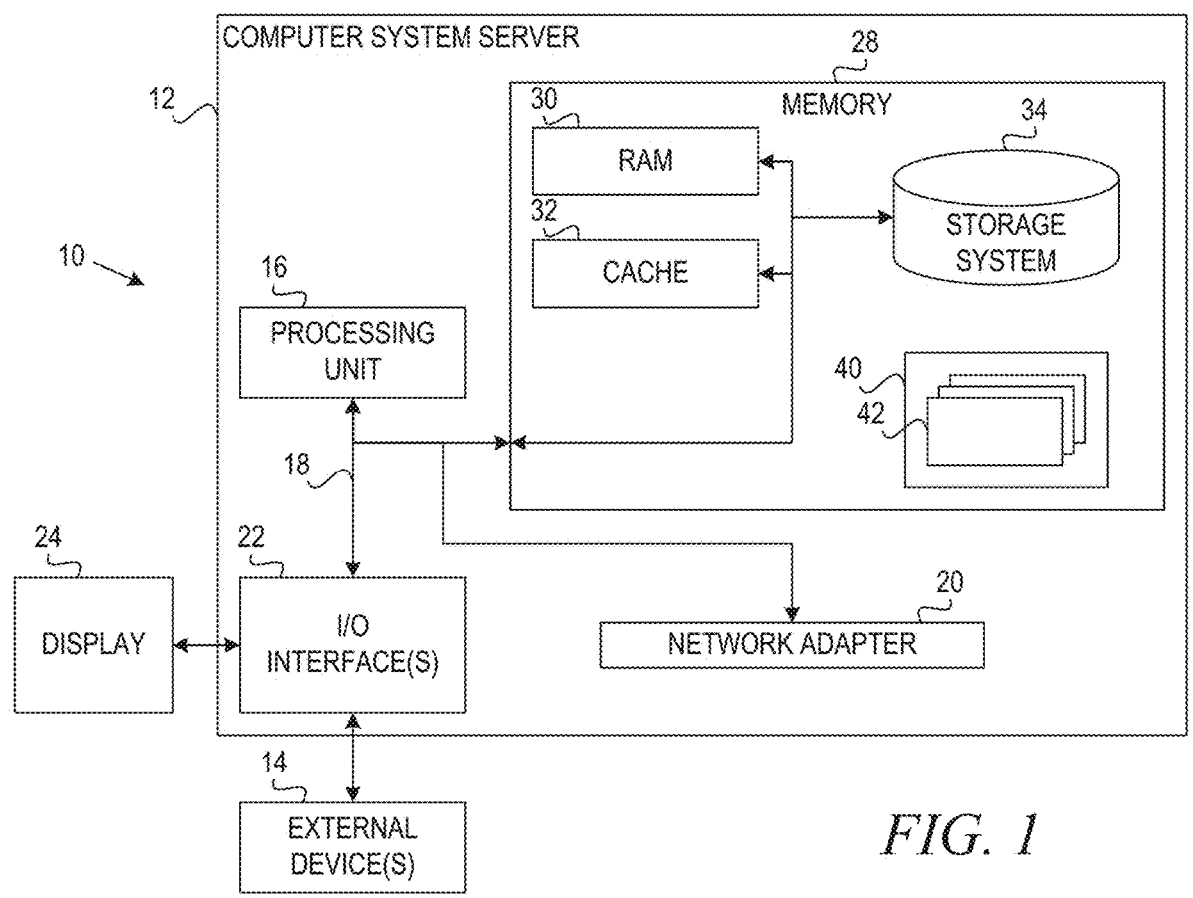
FIG. 1 depicts a cloud computing node according to an illustrative embodiment.

In order to perform middleware integration and transformation, a cloud service provider provides a platform (studio) to build workflows and integrate different systems seamlessly. This platform consists of multiple different activities that are exposed by the cloud service provider for the customers to use for building their workflows, called "orchestrations." These orchestrations are then deployed onto the cloud environment in a multi-tenancy model.

The studio provides hundreds of different activities and functions in order to build an orchestration. Often, the activity that the customer chooses is not perfect in terms of the security of the overall workflow. Without any benchmark available for comparison, it is very difficult for the customer to have an assessment about the security of its projects with the activities they have chosen to build the orchestrations from the studio. The illustrative embodiments solve this problem for the workflows using cognition.

The illustrative embodiments provide a cognitive mechanism that detects the usage of activities and functions within orchestration and their impacts on the overall security of the orchestration. The customer may not know hundreds of different activities and functions provided by the studio or workbench. Thus, the customer may not be able to use the correct activity with the correct configuration for a secure orchestration. The mechanism of the illustrative embodiments is cognitive in nature and self-learns over a period of time, detecting various patterns that are involved in the orchestration for security.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry, out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus IX. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
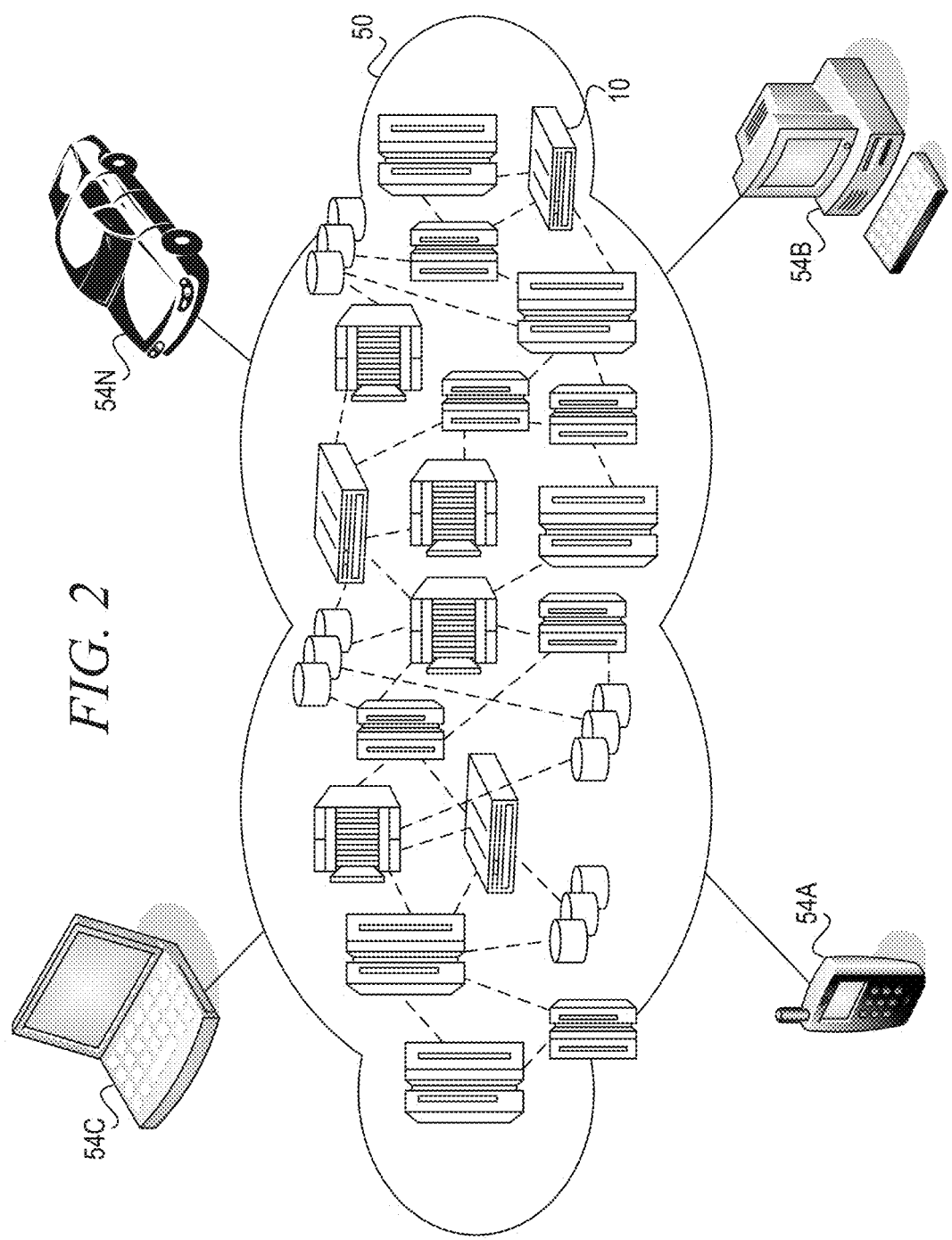
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
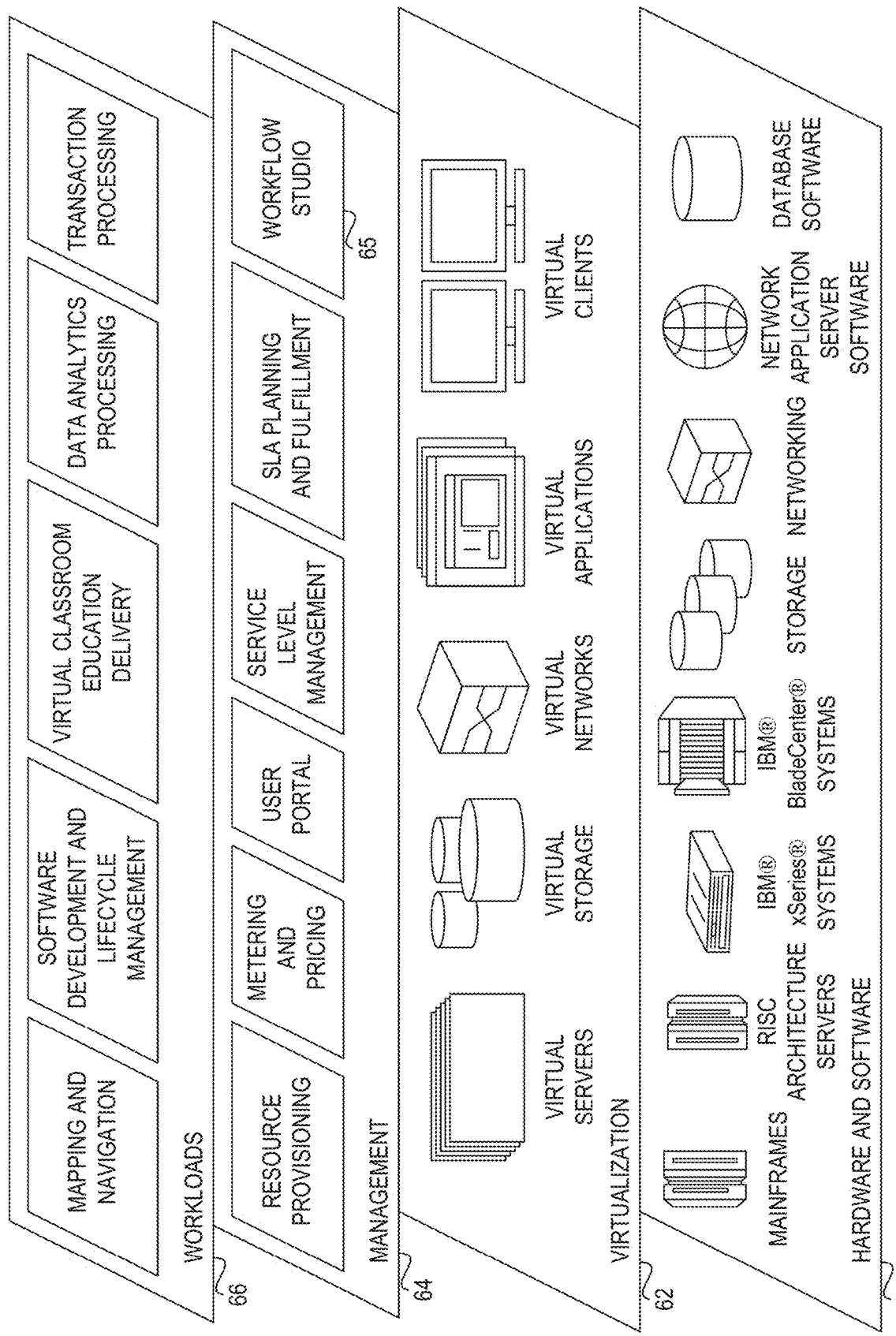
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

As used herein, the term "studio" refers to a development tool executing on a data processing system for cloud integration. It is in studio that orchestrations are developed. "Orchestrations" are the main components of an integration solution that integrates components executing on hardware within a cloud data processing system. All functionality in an integration solution is controlled by orchestrations. All projects must have at least one orchestration, but projects may contain more than one orchestration. An "activity" is a single unit of operation on a computing device within the cloud data processing system. Combinations of activities make up an orchestration.

In accordance with the illustrative embodiment, management layer 64 includes workflow studio 65 in which aspects of the illustrative embodiments are implemented. Workflow studio 65 cognitively detects the usage of activities in a workflow and then suggests an alternative to the customer if a given activity and its configuration cause a security violation. Workflow studio 65 uses historical analysis and self-learning based on initial decisions taken by the user. In response to a security violation, workflow studio 65 maps the security violation incident with the activities that are part of the orchestration and their corresponding configurations. Once any of these activities is part of a new orchestration, the user is prompted to verify that the activity does not violate a security policy. Workflow studio 65 may also recommend an alternate activity to the user. If the user accepts the recommendation and replaces the activity that is in violation, workflow studio 65 increases the risk score of the activity associated with the security violation incident.

Figure 4:
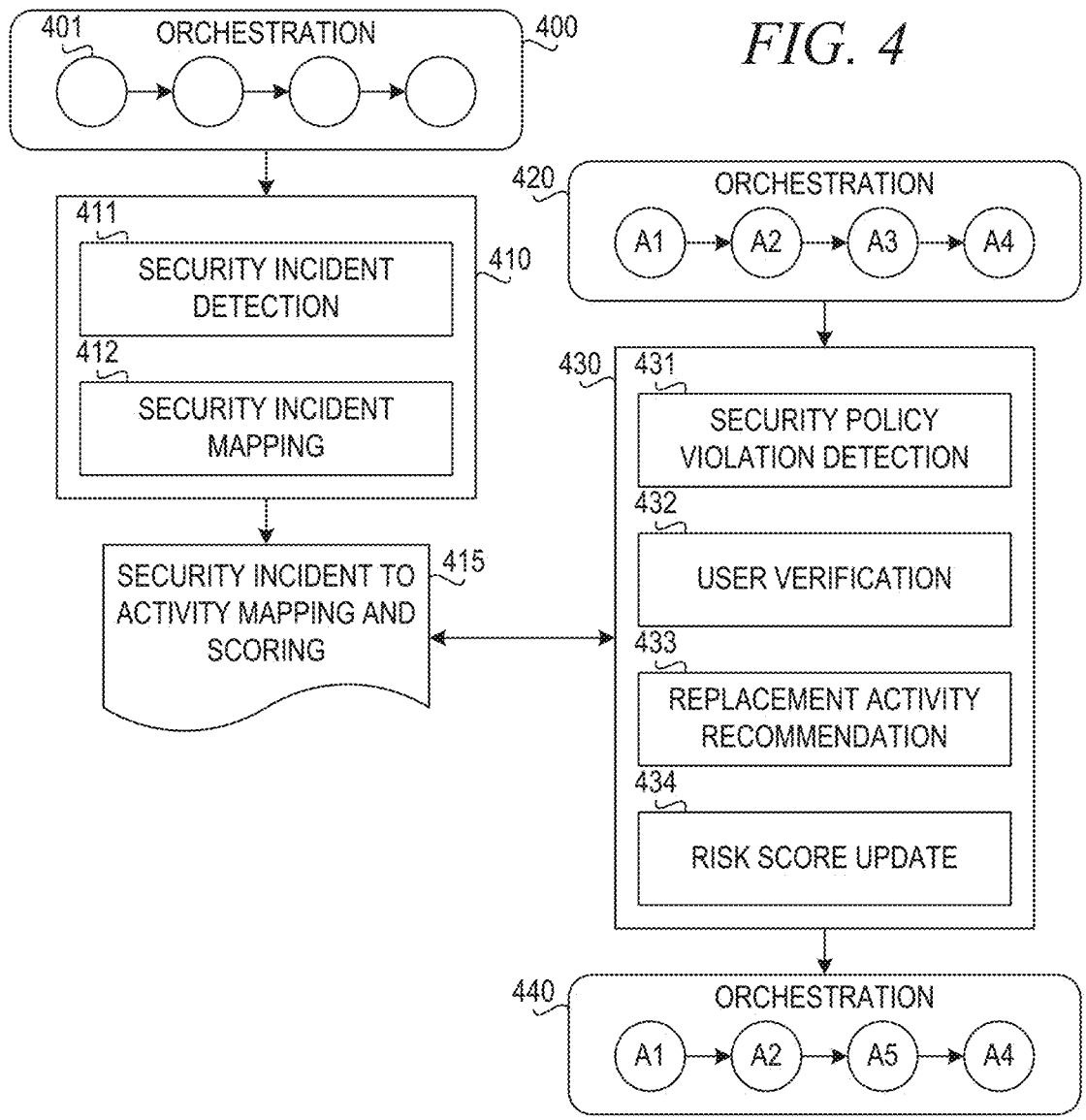
FIG. 4 is a block diagram illustrating a mechanism for cognitive security for workflows in accordance with an illustrative embodiment.

FIG. 4 is a block diagram illustrating a mechanism for cognitive security for workflows in accordance with an illustrative embodiment. The mechanism comprises training system 410 and cognitive security system 430. Training system 410 receives orchestrations 400. Each orchestration 400 includes a sequence of actions 401. Training system 410 includes a security incident detection component 411 and a security incident mapping component 412.

For each orchestration 400, security incident detection component 411 determines whether a security violation is experienced during execution of the orchestration 400. In other words, security incident detection component 411 determines whether orchestration 400 violates any of the security policies of the customer or the system. Reporting tools detect security threats by monitoring sockets or ports. For example, a firewall may report when certain ports or sockets are accessed. Thus, security incident detection component 411 may determine when such a security threat occurs or when the accesses seen at monitored sockets and/or ports violate security policies. Any such security threat or security policy violation may be defined as a security incident.

Security incident mapping component 412 amps security incidents to their respective activities. In one embodiment, security incident mapping component 412 adds all activities of orchestration 400 to a violation array, which consists of all the activities associated with an orchestration that caused a security incident. Each entry in the violation array may identify an activity, a configuration of the activity, and a risk score. In one example embodiment, the risk score is a counter with an initial value of 1 (one). If an activity is already in the violation array, security incident mapping component 412 may update the risk score, such as by incrementing the counter. The more often an activity is in an orchestration for which a security incident is detected, the more likely the activity is the cause of the incident, and this is reflected in the risk score. The resulting violation array forms security incident to activity mapping 415. In other words, when an activity is frequently involved in orchestrations for which security incidents are detected, one may deduce that the given activity is the cause of the security incidents.

In another example embodiment, a tool may provide detailed information about how or why a security threat happened. Security incident detection component 411 may use that information to determine an activity that caused the security incident. Security incident mapping component 412 may add a given activity to security incident to activity mapping 415 only when it can be determined that the given activity caused the security incident. Alternatively, security incident mapping component 412 may weight or increment the risk score more heavily when it is determined the given activity is the cause of the security incident.

In another example embodiment, security incident mapping component 412 may generate a vector of features for each orchestration, the vector of features describing the activities involved in the orchestration, the order of the activities, the configurations of the activities, and other parameters that make up the orchestration. Security incident mapping component 412 may then update security incident to activity mapping 415 to form a machine learning model based on the feature vectors of orchestrations 400. Security incident mapping component 412 may label each feature vector as true or false based on whether the feature vector corresponds to an orchestration that encountered a security violation. A feature vector may be labeled as true if a security incident is encountered and false if a security incident is not encountered, or vice versa.

In yet another embodiment, security incident mapping component 412 may provide a label for each activity in the orchestration 400, wherein each label indicates whether its corresponding activity caused the security incident. Thus, security incident to activity mapping 415 may provide a machine learning model that learns over time whether each activity in the context of its orchestration and configuration is likely to cause a security incident.

In this example embodiment, security incident to activity mapping 415 may be regression model, more particularly a linear regression model. In this example, security incident mapping component 412 may update security incident to activity mapping machine 415 by updating weight values for features as more and more orchestrations 400 are processed. Thus, as more orchestrations 400 are encountered and labeled as true or false, the more accurate the machine learning model in security incident to activity mapping 415 becomes.

Training system 410 may initially process a plurality of orchestrations 400 to establish an initial mapping 415 as a baseline. Once enough orchestrations 400 are processed by training system 410, incident-to-activity mapping 415 may provide sufficient information to detect when a new orchestration 420 includes an activity that may violate the security policy of the customer or the computer system.

When a new orchestration 420 is created, cognitive security system 430 compares a list of its activities to security incident to activity mapping 415. Cognitive security system 430 includes security policy violation detection component 431, user verification component 432, replacement activity recommendation component 433, and risk score update component 434.

Consider the example shown in FIG. 4, where new orchestration 420 includes activities A1, A2, A3, A4. Security policy violation detection component 431 compares each of activities A1, A2, A3, A4 to incident-to-activity mapping 415. In the depicted example, activity A3 has been involved in at least one security, incident; therefore, activity A3 has an entry in mapping 415 and has an associated risk score. In one embodiment, user verification component 432 then prompts the user to verify whether activity A3 violates a security policy. Replacement activity recommendation component 433 recommends an alternate activity, e.g., activity A5, that performs the same function as activity A3. Alternatively, replacement activity recommendation component 433 may simply prompt the user to remove activity A3 from orchestration 420. Replacement activity recommendation component 433 may also provide access to a library for the user to find a replacement activity on his or her own.

If the user removes or replaces activity A3 in orchestration 420, risk score update component 434 updates the risk score associated with activity A3 in mapping 415. In the depicted example, the user replaces activity A3 with activity A5 to form orchestration 440. Thus, risk score update component 434 updates the risk score, such as by incrementing the score by 1 (one). The risk score of activity A3 has increased; therefore, whenever activity A3 appears in any new orchestration, cognitive security system 430 prompts the user to remove or replace the activity. The increased risk score for the activity helps the user to make an informed decision of removing or replacing the activity from the orchestration. Over a period of time, all activities in incident-to-activity mapping 415 will have a more accurate risk score, and cognitive security system 430 will be able to inform the user of the security risk for each activity that is a part of a newly created orchestration.

In one illustrative embodiment, security policy violation detection component 431 may perform a decision based on the activities in the orchestration 420 as well as their configurations. Security policy violation detection component 431 may form a feature vector from the identification of a given activity, the configuration of the activity within the orchestration, and other factors. Security policy violation detection component 431 may then perform machine learning to generate a risk score based on those features. For example, security policy violation detection component 431 may use a linear regression algorithm to determine a risk score based on the feature vector and learn from the decisions over time.

In one example embodiment, security policy violation detection component 431 may simply determine whether each activity in orchestration 420 is mapped to a security incident in mapping 415 and compare its associated risk score to a threshold. In one embodiment, the risk score may be a number of times the activity is involved in a security incident. The threshold value may be set by a user to a number that is at the threshold between a reasonable number of security incidents for an activity to be involved in and a number at which one would deduce that the activity itself is the cause of the security incidents. Alternatively, the threshold value may be based on a percentage of orchestrations containing the activity that also is involved in a security incident. Thus, a user may determine that if 20% of orchestrations containing a given activity encounter a security incident, then that is acceptable, but if 80% of orchestrations containing a given activity encounter a security incident, then the activity should be replaced. The user may then determine that a threshold of 50% or some other reasonable value would be an accurate indicator.

In another example embodiment, replacement activity recommendation component 433 may determine a replacement activity based on historical analysis of replacements made by past users. Thus, if users frequently replace activity A3 with activity A5, and activity A5 has a low risk score, then replacement activity recommendation component 433 may determine that activity A5 is a suitable replacement for activity A3 with high confidence. Replacement activity recommendation component 433 may use techniques such as clustering or cohort analysis to identify similar orchestrations and to identify what replacements were made in those similar orchestrations.

In another example embodiment, risk score update component 434 may reduce or reset a risk score for an activity if the activity was modified to overcome the security concern. For example, if activity A3 is subsequently modified and tested to confirm the activity will not cause a security incident, then the risk score may be reset to 0 or 1. Alternatively, if a user verifies that an activity does not violate a security policy and the activity is used without causing a security incident, then risk score update component 434 may decrement the risk score associated with that activity.

The present invention may be a system, a method, and/or a computer program product. The computer program product may include a computer readable storage medium (or media) having computer readable program instructions thereon for causing a processor to early out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 5 is a flowchart illustrating operation of a cognitive security training mechanism in accordance with an illustrative embodiment. Operation begins (block 500), and the mechanism stores a list of arrays where each array is an orchestration and its individual activities and their configurations are the elements of the array (block 501). The mechanism determines whether there is a new orchestration to consider (block 502). If there is a new orchestration, then the mechanism appends the new orchestration, as an array, to the list (block 503). Thereafter, operation returns to block 502 to determine whether there is a new orchestration.

If there is no new orchestration in block 502, then for each orchestration in the list, the mechanism checks if the orchestration violates any security policy (block 504. The mechanism determines whether there is a security violation (block 505). If there is a security violation, then the mechanism puts the activities of all orchestrations in violation in a violation array each with an initial risk score (block 506). In one embodiment, the mechanism puts all activities of the orchestration in the violation array. In an alternative embodiment, the mechanism determines the activity that caused the security violation and puts only the violating activity in the violation array. The initial risk score may be a predetermined value, such as 1 (one). Alternatively, the initial risk score may be determined based on a machine learning technique, such as linear regression analysis, as discussed above.

Thereafter, or if there is no violation in block 505, the mechanism determines whether the orchestration is the last orchestration in the list (block 507). If the orchestration is not the last, then operation returns to block 504 to consider the next orchestration in the list. If the orchestration is the last in the list in block 507, then operation ends (block 508).

The process depicted in FIG. 5 may repeat for orchestrations executing within the cloud service having new security events or incidents.

FIG. 6 is a flowchart illustrating operation of a cognitive security mechanism for recommending activity removal or replacement in a newly created orchestration in accordance with an illustrative embodiment. Operation begins when a new orchestration is created (block 600), and the mechanism compares all activities in the newly created orchestration to the violation array (block 601). For each activity in the violation array, the mechanism compares the risk score to a threshold (block 602), and the mechanism determines whether the risk score is greater than the threshold (block 603). If the risk score is not greater than the threshold, then operation ends (block 607).

If the risk score is greater than the threshold in block 603, then the mechanism recommends to the user to remove or replace the activity from the orchestration (block 604). The mechanism determines whether the activity is removed or replaced from the orchestration (block 605). If the user does not remove or replace the activity, then operation ends (block 607).

If the user removes or replaces the activity from the orchestration in block 605, then the mechanism increments the risk score (block 606), and operation ends (block 607).

In alternative embodiments, the mechanism may determine a risk score for each activity using cognitive techniques, such as regression analysis or clustering. The mechanism may also recommend a replacement activity using cognitive techniques, such as clustering or cohort analysis.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/C) device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a cloud data processing system comprising at least one processor and at least one memory, the at least one memory comprising instructions which are executed by the at least one processor and configure the processor to implement a cognitive security system which operates to perform the method, comprising:
    generating, by the cognitive security system, a violation array, wherein each entry of the violation array represents identification of a workflow activity that violates a security policy, wherein a workflow activity is a unit of operation on a computing device within the cloud data processing system and wherein a workflow orchestration is a combination of workflow activities, wherein generating the violation array comprises:
    storing a list of workflow orchestrations;
    monitoring sockets or ports in the cloud data processing system;
    for each given orchestration within the list of workflow orchestrations, determining whether execution of the given orchestration in the cloud data processing system causes a security incident based on access seen at the monitored sockets or ports; and
    responsive to a given workflow activity of the given orchestration causing a security incident, generating an entry in the violation array corresponding to the given workflow activity, wherein the entry identifies the given workflow activity, a configuration of the given workflow activity, and a risk score associated with the given workflow activity;
    responsive to a new workflow orchestration being created by a user to implement an integration solution within the cloud data processing system, comparing, by the cognitive security system, each workflow activity of the new workflow orchestration to the violation array; and
    responsive to determining a given workflow activity of the new workflow orchestration exists in the violation array, recommending, by the cognitive security system, to the user to remove the given workflow activity from the new workflow orchestration.

2. The method of claim 1, wherein each entry of the violation array comprises a risk score associated with the corresponding workflow activity and wherein comparing each workflow activity of the new workflow orchestration to the violation array comprises comparing a given risk score of the given workflow activity to a threshold.

3. The method of claim 2, further comprising:
    responsive to determining the user has removed the given workflow activity from the new workflow orchestration, incrementing the risk score associated with the given workflow activity.

4. The method of claim 1, further comprising prompting the user to verify whether the given workflow activity does not violate the security policy.

5. The method of claim 1, wherein recommending to the user to remove the given workflow activity from the new workflow orchestration comprises recommending a replacement workflow activity to replace the given workflow activity.

6. The method of claim 1, wherein generating the violation array comprises:
    responsive to the given orchestration causing a security incident, adding all activities of the given orchestration in the violation array.

7. The method of claim 1, wherein generating the violation array further comprises:
    for each given orchestration within the list of workflow orchestrations, generating a vector of features, updating a security incident to activity mapping to form a machine learning model based on the feature vectors of orchestrations, and labeling each feature vector as true or false based on whether the feature vector corresponds to an orchestration that encountered a security violation.

8. The method of claim 7, wherein the vector of features describes the activities involved in the orchestration, the order of the activities, the configurations of the activities, and other parameters that make up the orchestration.

9. The method of claim 7, wherein comparing each workflow activity of the new workflow orchestration to the violation array comprises:
    for each given workflow activity, forming a feature vector and generating a risk score based on the feature vector using the machine learning model.

10. A computer program product comprising a computer readable storage medium having a computer readable program stored therein, wherein the computer readable program, when executed on at least one processor, causes the at least one processor to implement a cognitive security system, wherein the computer readable program causes the at least one processor to:
    generate, by the cognitive security system, a violation array, wherein each entry of the violation array represents identification of a workflow activity that violates a security policy, wherein a workflow activity is a unit of operation on a computing device within a cloud data processing system and wherein a workflow orchestration is a combination of workflow activities, wherein generating the violation array comprises:

storing a list of workflow orchestrations;
monitoring sockets or ports in the cloud data processing system;
for each given orchestration within the list of workflow orchestrations, determining whether execution of the given orchestration in the cloud data processing system causes a security incident based on access seen at the monitored sockets or ports; and
responsive to a given workflow activity of the given orchestration causing a security incident, generating an entry in the violation array corresponding to the given workflow activity, wherein the entry identifies the given workflow activity, a configuration of the given workflow activity, and a risk score associated with the given workflow activity;
responsive to a new workflow orchestration being created by a user to implement an integration solution within the cloud data processing system, compare, by the cognitive security system, each workflow activity of the new workflow orchestration to the violation array; and
responsive to determining a given workflow activity of the new workflow orchestration exists in the violation array, recommend, by the cognitive security system, to the user to remove the given workflow activity from the new workflow orchestration.

11. The computer program product of claim 10, wherein each entry of the violation array comprises a risk score associated with the corresponding workflow activity and wherein comparing each workflow activity of the new workflow orchestration to the violation array comprises comparing a given risk score of the given workflow activity to a threshold.

12. The computer program product of claim 11, wherein the computer readable program further causes the at least one processor to:
responsive to determining the user has removed the given workflow activity from the new workflow orchestration, increment the risk score associated with the given workflow activity.

13. The computer program product of claim 10, wherein the computer readable program further causes the at least one processor to prompt the user to verify whether the given workflow activity does not violate the security policy.

14. The computer program product of claim 10, wherein recommending to the user to remove the given workflow activity from the new workflow orchestration comprises recommending a replacement workflow activity to replace the given workflow activity.

15. The computer program product of claim 10, wherein generating the violation array comprises:
responsive to the given orchestration causing a security incident, adding all activities of the given orchestration in the violation array.

16. An apparatus comprising:
at least one processor; and
a memory coupled to the at least one processor, wherein the memory comprises instructions which, when executed by the at, least one processor, cause the at least one processor to implement a cognitive security system, wherein the instructions cause the at least one processor to:
generate, by the cognitive security system, a violation array, wherein each entry of the violation array represents identification of a workflow activity that violates a security policy, wherein a workflow activity is a unit of operation on a computing device within a cloud data processing system and wherein a workflow orchestration is a combination of workflow activities, wherein generating the violation array comprises:
storing a list of workflow orchestrations;
monitoring sockets or ports in the cloud data processing system;
for each given orchestration within the list of workflow orchestrations, determining whether execution of the given orchestration in the cloud data processing system causes a security incident based on access seen at the monitored sockets or ports; and
responsive to a given workflow activity of the given orchestration causing a security incident, generating an entry in the violation array corresponding to the given workflow activity, wherein the entry identifies the given workflow activity, a configuration of the given workflow activity, and a risk score associated with the given workflow activity;
responsive to a new workflow orchestration being created by a user to implement an integration solution within the cloud data processing system, compare, by the cognitive security system, each workflow activity of the new workflow orchestration to the violation array; and
responsive to determining a given workflow activity of the new workflow orchestration exists in the violation array, recommend, by the cognitive security system, to the user to remove the given workflow activity from the new workflow orchestration.

17. The apparatus of claim 16, wherein each entry of the violation array comprises a risk score associated with the corresponding workflow activity and wherein comparing each workflow activity of the new workflow orchestration to the violation array comprises comparing a given risk score of the given workflow activity to a threshold.

18. The apparatus of claim 17, wherein the instructions further cause the at least one processor to:
responsive to determining the user has removed the given workflow activity from the new workflow orchestration, increment the risk score associated with the given workflow activity.

19. The apparatus of claim 16, wherein recommending to the user to remove the given workflow activity from the new workflow orchestration comprises recommending a replacement workflow activity to replace the given activity.

20. The apparatus of claim 16, wherein generating the violation array comprises:
responsive to the given orchestration causing a security incident, adding all activities of the given orchestration in the violation array.

* * * * *